United States Patent [19]

Kumasaka et al.

[11] Patent Number: 4,799,416

[45] Date of Patent: Jan. 24, 1989

[54] GUARD-MOVING SYSTEM IN A CUTTING APPARATUS

[75] Inventors: Taiichi Kumasaka; Yasuyuki Hirano; Katsuhiko Ozaki; Koichi Sawada, all of Katsuta, Japan

[73] Assignee: Hitachi Koki Company, Ltd., Tokyo, Japan

[21] Appl. No.: 176,340

[22] Filed: Mar. 31, 1988

[30] Foreign Application Priority Data

Apr. 3, 1987 [JP] Japan ................................ 62-83450

[51] Int. Cl.[4] ......................... B23D 45/04; B27B 5/20

[52] U.S. Cl. ........................................ 83/397; 83/478; 83/471.3; 83/490

[58] Field of Search ...................... 83/397, 478, 471.3, 83/490, DIG. 1

[56] References Cited

U.S. PATENT DOCUMENTS 4,318,324 3/1982 Hall et al. ............................ 83/397
4,343,213 8/1982 Drixler ................................ 83/397
4,581,966 4/1986 Kaiser et al. .......................... 83/397

*Primary Examiner*—Donald R. Schran
*Attorney, Agent, or Firm*—Cushman, Darby & Cushman

[57] ABSTRACT

A cutting apparatus comprising a swinging cutter unit which is pivotally coupled through a first shaft to a stationary working table so as to be swingable about the first shaft between its raised resting position and its lowered cutting position. The swinging cutter unit includes a motor-driven circular saw-blade fixedly mounted on a second shaft coupled to a drive motor, a housing for partially encasing an upper side portion of the circular saw-blade and supporting the second shaft so that the circular saw-blade is rotatable about the second shaft in response to operation of the drive motor, and a blade guard supported by the housing to be rotatable about the second shaft to expose and cover the saw-blade. The blade guard is biased by means of a spring so as to cover the saw-blade and has an engaging device at a portion of the outer surface thereof. An elongated arm is provided such that one end portion thereof is fixedly secured to a stationary portion of the cutting apparatus and the other end portion thereof is positioned near the engaging device. At the other end portion is provided a third shaft engaged with the engaging device so that the blade guard is rotated about the second shaft in response to a swinging movement of the cutter unit to expose the saw-blade when the cutter unit is moving to the cutting position and cover the portion thereof when moving to the resting position.

3 Claims, 4 Drawing Sheets

GUARD-MOVING SYSTEM IN A CUTTING APPARATUS

BACKGROUND OF THE INVENTION

The present invention relates generally to cutting apparatus, and more particularly to such a cutting apparatus with a guard-moving system for rotationally moving a blade-guard to cover and expose partially a rotating and swinging type blade in accordance with its operating position.

Generally, a blade-swingable type cutting apparatus such as chop saw with circular saw blade are pivotably supported on a shaft to be movable with respect to a work table between its rest position and its operating position and, for safety purposes, the blade portion is preferably covered and exposed entirely and partially by a blade guard which is in turn movable rotationally by means of a moving mechanism. Various types of blade-guard moving mechanisms have been developed heretofore. One known arrangement is illustrated in U.S. Pat. No. 4,581,966 or japanese Patent Provisional Publication No. 60-71113, where a blade guard is rotationally movable by means of a linkage device comprising four hinges and four levers. However, such a four-hinge type blade-guard moving system causes a complex structure resulting in increase in manufacturing cost and the exchange of the blade being troublesome. Thus, a further improvement would be required from the viewpoint of making simpler the blade-guard moving system and the blade-exchanging operation.

SUMMARY OF THE INVENTION

It is therefore an object of the present invention to provide a new and improved blade-guard moving system of a cutting apparatus which is capable of being simpler so as to simplifying the exchanging operation of a blade with respect to the blade guard.

The cutting apparatus comprises a swinging cutter unit which is pivotally coupled through a first shaft to a stationary working table so as to be swingable about the first shaft between its raised resting position and its lowered cutting position, the swinging cutter unit including a motor-driven circular saw-blade fixedly mounted on a second shaft coupled to a drive motor, a housing for partially encasing an upper side portion of the circular saw-blade and supporting the second shaft so that the circular saw-blade is rotatable about the second shaft in response to operation of the drive motor, and a blade guard supported by the housing to be rotatable about the second shaft to expose and cover the saw-blade. A feature of the present invention involves a technique where the blade guard has an engaging device at a portion of the outer surface thereof, and an elongated arm is provided such that one end portion thereof is fixedly secured to a stationary portion of the cutting apparatus and the other end portion thereof is positioned near the engaging device and has at the the other end portion a third shaft engaged with the engaging device so that the blade guard is rotated about the second shaft in response to a swinging movement of the cutter unit to expose the saw-blade when the cutter unit is moving to the cutting position and cover the portion thereof when moving to the resting position. This feature makes simple the structure of the balde-guard moving system of the cutting apparatus and make possible easy exchange of the saw-blade as compared with the prior art cutting apparatus.

In accordance with the present invention, there is provided a cutting apparatus comprising: working table means fixedly secured to a base; cutter means is pivotally coupled through a first shaft to said working table means so as to be swingable about said first shaft between its raised resting position and its lowered cutting position cutting a work piece placed on said working table means, said cutter means including a motor-driven circular saw-blade fixedly mounted on a second shaft which is coupled to a drive shaft of a drive motor, a blade housing for partially encasing an upper side portion of said circular saw-blade and supporting said second shaft so that said circular saw-blade is rotatable about said second shaft in response to operation of said drive motor, and a movable blade guard disposed to be rotatable about said second shaft to expose and cover a portion of said circular saw-blade, said movable blade guard being biased by means of spring means in a direction to cover said portion of said circular saw-blade and having an engaging device at a portion of the outer surface thereof; and an elongated arm member one end portion of which is fixedly secured to a stationary portion of said cutting apparatus and the other end portion of which is positioned near said engaging device provided on said movable blade guard, said elongated arm member having at the other end portion a third shaft which is engaged with said engaging device of said movable blade guard so that said movable blade guard is rotated about said second shaft in response to a swinging movement of said cutter means about said first shaft to expose a portion of said saw-blade when said cutter means is moving to the cutting position and to cover the portion thereof when moving to the resting position.

BRIEF DESCRIPTION OF THE DRAWINGS

The present invention will be described in further detail with reference to the accompanying drawings, in which.

DETAILED DESCRIPTION OF THE INVENTION

Figure 1:
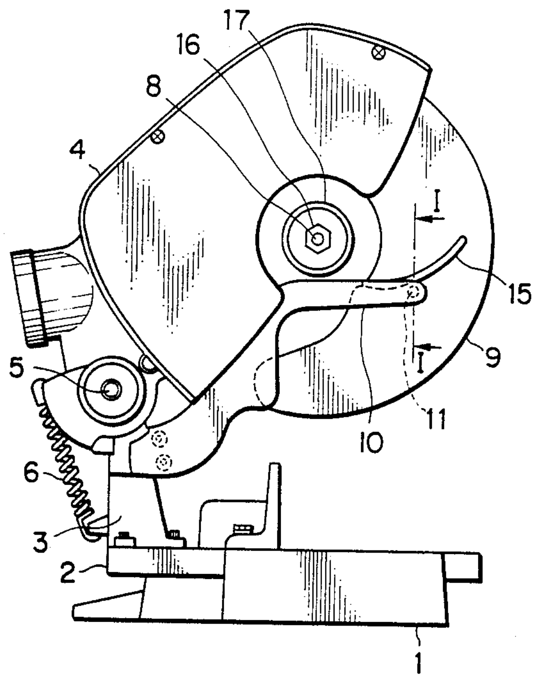
FIG. 1 is a front view showing a chop saw type cutting apparatus with a blade-guard moving system according to an embodiment of the present invention.
Figure 2:
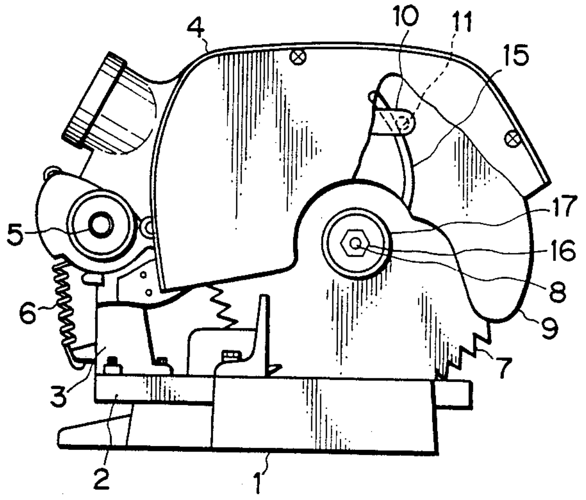
FIG. 2 is an illustration of the FIG. 1 cutting apparatus which is in its operating position.

Referring now to FIGS. 1 through 7, there is illustrated a chop saw type cutting apparatus with an embodiment of a blade-guard moving system according to the present invention. The chop saw type cutting apparatus includes a work table 2 fixedly secured to a base 1 and a cutting section comprising a motor-driven circular saw-blade 7, a blade housing 4 for partially covering the circular saw-blade 7, and a saw-blade drive motor, not shown, supported by the blade housing. The cutting section and the work table 2 are coupled to each other through a holder 3, one end portion of which is fixedly secured to one end portion of a surface of the work table 2 and the other end portion of which is pivotably coupled by means of a first shaft 5 to a portion of the blade housing 4 so that the cutting section is swingable about the shaft 5 between its raised resting position (see FIG. 1) and its lowered operating position (see FIG. 2). A spring 6 is provided between the blade housing 4 and the holder 3 so that the cutting section is always biased toward the resting position. The movement thereof toward the operating position is due to an operating lever, not shown. The circular saw-blade 7 is at its center portion supported by a second shaft 8 so as to be rotatable about the second shaft 8, the rotation of the circular saw-blade in its operating position allowing cut of a work piece 18 placed on the work table 2. The second shaft 8 is coupled to a drive shaft of the blade drive motor, not shown. Also included in the cutting section is a movable blade guard 9 which is supported by the housing 4 so as to be rotationally movable about the second shaft 8 to expose a portion of the circular saw blade 7 when the cutting section is in its operating position and cover the exposed portion of the circular saw blade 7 when the circular saw blade when being in its resting position. The blade guard 9 is urged to be rotated thereabout clockwise in FIG. 1 by means of another spring, not shown, which may be provided between the blade housing 4 and the movable blade guard 9.

Figure 3:
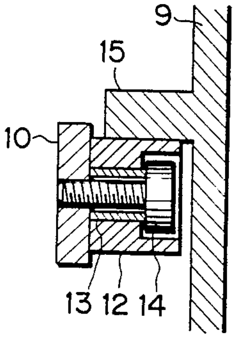
FIG. 3 is a cross-sectional view showing a shaft engaged with a portion of a blade guard, taken along line I—I in FIG. 1.

An arm 10 is at its one end portion secured fixedly to a portion of the holder 3 between the pivotally coupling portion to the housing 4 and the securing portion to the work table 2 and extends toward the circular saw blade 7. At the other end portion of the arm 10 is provided a third shaft 11 which is positioned to be further away from the first shaft 5 as compared with the position of the second shaft 8. The third shaft 11, as shown in FIG. 3, is composed of a screw-like member 14 which is engaged through a distance piece 13 to a roller 12 which in turn becomes rotatable. The roller 12 is at its peripheral surface engaged with an arc-shaped portion 15 protrusively formed on the blade guard 9.

Figure 4:
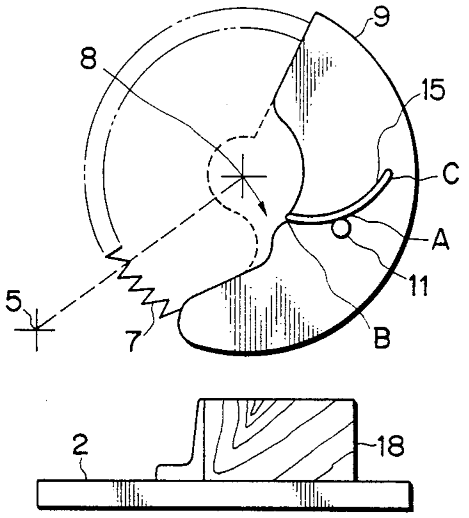
FIGS. 4 to 6 are illustrations for describing movement of the blade guard in accordance with positions of a saw-blade.
Figure 5:
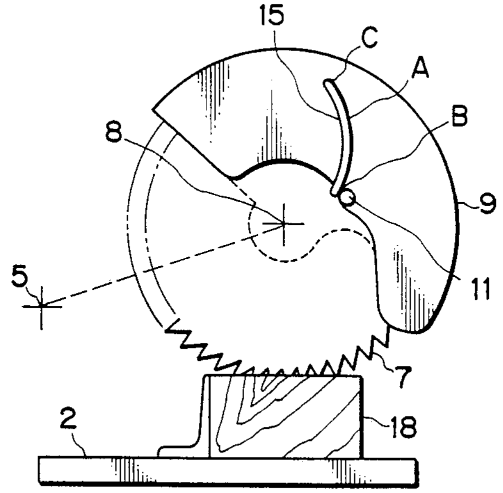
Figure 6:
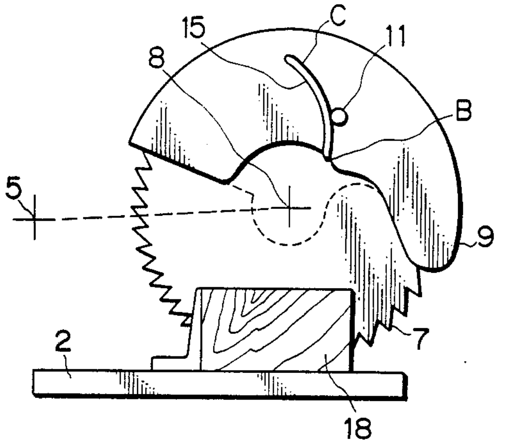
Figure 7:
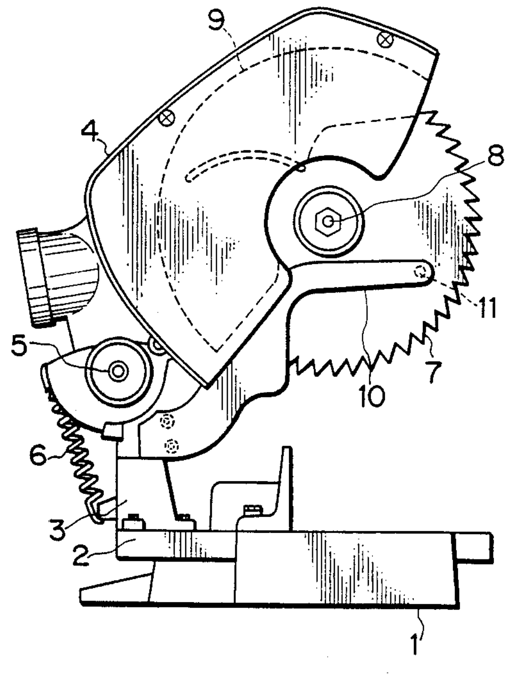
FIG. 7 is an illustration for describing a lifting operation of the blade guard for exchange of the saw-blade.

Operation of the blade guard 9 will be described hereinbelow with respect to FIGS. 4 through 6. In the state illustrated in FIG. 4 showing the cutting section positioned at the resting position, the arc-shaped protruding portion 15 is at a position A engaged with the third shaft 11. Thereafter, when lowering the cutting section, the second shaft 8 is rotated about the first shaft 5 in a direction indicated an an arrow, and in response to the cutting section to its operating position the third shaft 11 is moved along the arc-shaped protruding portion 15 so as to reach a portion B of the arc-shaped protruding portion 15. This engaging movement of the third shaft 11 and the arc-shaped protruding portion 15 causes rotation of the blade guard 9 about the second shaft 8, thereby resulting in partially exposing the saw-blade 7 to allow cutting of a work piece as shown in FIG. 5. On the other hand, in response to a further lowering operation of the cutting section, the third shaft 11 is moved in the reverse direction, i.e., toward a position C of the arc-shaped protruding portion 15, with the engagement therebetween, finally resulting in the state illustrated in FIG. 2. Thereafter, in response to the upward movement of the cutting section, with the engaging movement of the third shaft 11 and the arc-shaped protruding portion 15 becoming in reverse, the cutting section returns to the resting position shown in FIG. 4.

According to the arrangement of this embodiment, although the blade guard 9 is arranged to cover the saw blade 7 by the guard-biasing spring (not shown) when the cutting section is in the resting position as shown in FIG. 1, it is possible to easily lift the blade guard 9 against the guard-biasing spring, making possible easy saw-blade exchange with the blade guard being lifted upwardly and with fitting means comprising a nut 16 and washer 17 being removed therefrom.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. A cutting apparatus comprising:

working table means fixedly secured to a base;

cutter means is pivotally coupled through a first shaft to said working table means so as to be swingable about said first shaft between its raised resting position and its lowered cutting position cutting a work piece placed on said working table means, said cutter means including a motor-driven circular saw-blade fixedly mounted on a second shaft which is coupled to a drive shaft of a drive motor, a blade housing for partially encasing an upper side portion of said circular saw-blade and supporting said second shaft so that said circular saw-blade is rotatable about said second shaft in response to operation of said drive motor, and a movable blade guard disposed to be rotatable about said second shaft to expose and cover a portion of said circular saw-blade, said movable blade guard being biased by means of spring means in a direction to cover said portion of said circular saw-blade and having an engaging device at a portion of the outer surface thereof; and an elongated arm member one end portion of which is fixedly secured to a stationary portion of said cutting apparatus and the other end portion of which is positioned near said engaging device provided on said movable blade guard, said elongated arm member having at the other end portion a third shaft which is engaged with said engaging device of said movable blade guard so that said movable blade guard is rotated about said second shaft in response to a swinging movement of said cutter means about said first shaft to expose a portion of said saw-blade when said cutter means is moving to the cutting position and to cover the portion thereof when moving to the resting position.

2. A cutting apparatus as claimed in claim 1, wherein said engaging device is made of an arc-shaped member protrusively provided on said movable blade guard and said third shaft has at its outer surface a roller which is movable along said arc-shaped member in response to the swinging movement of said cutter means.

3. A cutting apparatus as claimed in claim 1, wherein the one end portion of said elongated arm member is fixedly secured to said work table means which is near said first shaft.

* * * * *